Jan. 11, 1966  R. E. GRANTHAM ETAL  3,228,337
RADIO FREQUENCY FREE COMMUNICATION SYSTEM
Filed Dec. 4, 1962
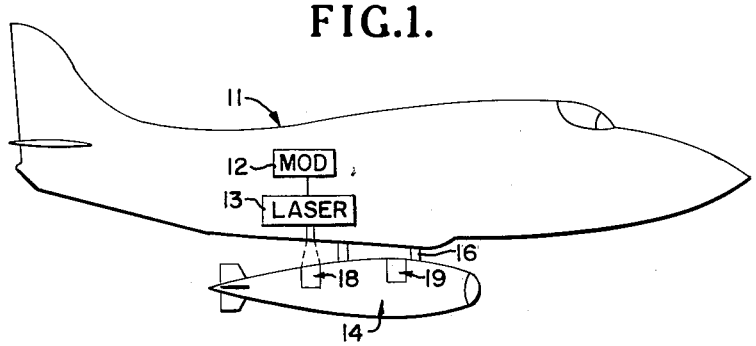
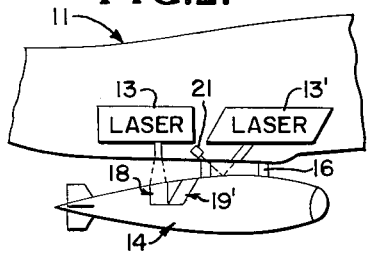
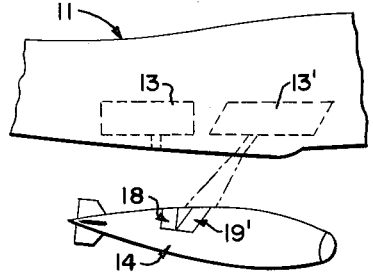
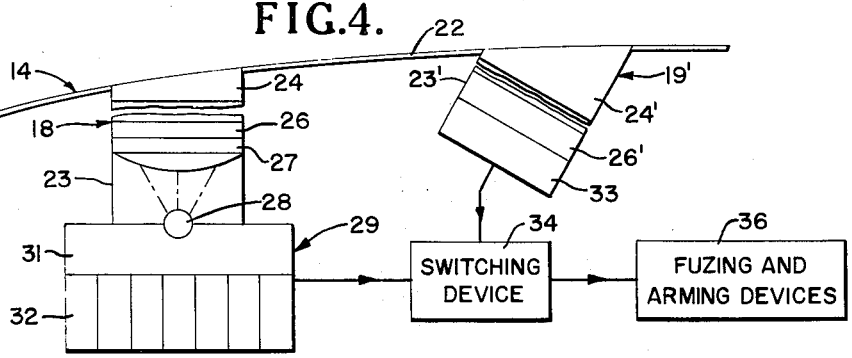
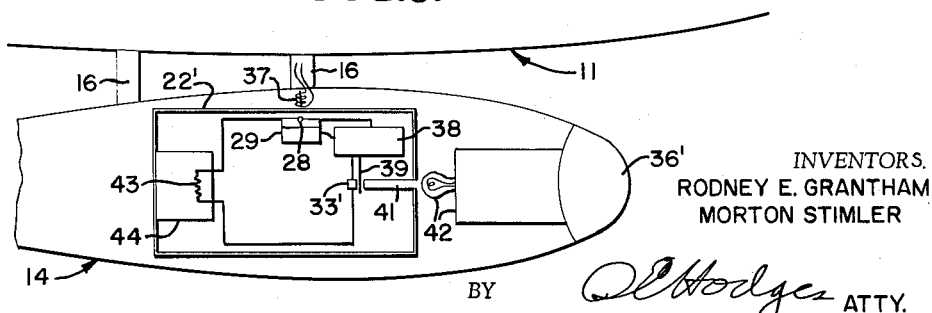
INVENTORS.
RODNEY E. GRANTHAM
MORTON STIMLER
BY  *O. E. Hodges* ATTY.
*Frank G. Nieman* AGENT

United States Patent Office 3,228,337
Patented Jan. 11, 1966

3,228,337
RADIO FREQUENCY FREE COMMUNICATION SYSTEM
Rodney E. Grantham, Bethesda, and Morton Stimler, Hyattsville, Md., assignors to the United States of America as represented by the Secretary of the Navy
Filed Dec. 4, 1962, Ser. No. 242,332
13 Claims. (Cl. 102—70.2)
(Granted under Title 35, U.S. Code (1952), sec. 266)

The invention described herein may be manufactured and used by or for the Government of the United States of America for governmental purposes without the payment of any royalties thereon or therefor.

The present invention relates to a communication system which is free from radio frequency interference and utilizes direct current and light energy to accomplish transmission of intelligence between two points.

The prior art methods of communicating intelligence from a part of an aircraft to a missile, which the aircraft was carrying, was generally accomplished by a cable connected directly from the missile to the aircraft to conduct electrical impulses. This system was susceptible to stray radio frequency energy aboard the aircraft and within the atmosphere, so that it was possible for the receiver within the missile to interpret the stray radio frequency energy as a valid command thereby resulting in a hazard from malfunction. The system worked well in the slower aircraft, but in high speed aircraft the physical umbilical cord connection between the aircraft and the bomb is often broken due to the whipping back and forth in the wind. Furthermore, the umbilical cord is a means of transmitting unwanted radio frequency votages from the aircraft's radar and radio equipment to the missile thereby creating a hazard to safety from malfunction.

The general purpose of this invention is to provide a new and improved communication system between an aircraft and the missile which it is carrying by providing a radio frequency conductive shield means for enclosing the receiver and at the same time eliminating the mechanical linkage between an aircraft and the missile and yet maintaining the advantages of radio communication. In the illustrative embodiments of the present invention a means is provided for activating a battery by either light or electromechanical energy for enabling the fuzing and arming devices of the missile to be properly set in response to a predetermined coded pulse train transmitted subsequent to the release of the missile from the aircraft. Safety means are also provided for preventing the arming and fuzing devices to be set if the missile is not properly and completely released from the aircraft.

An object of the present invention is to provide a self-powered completely detached radio-frequency free receiver operable in response to coded light energy input pulses.

A further object of the present invention is to provide a fuzing and arming device which is isolated and physically separated from the aircraft, but maintained under the control of the aircraft by light energy.

Yet another object is to provide an optical path into a radio frequency free enclosure for laser light energy while completely blocking all radio frequency radiation.

Another object is to provide a fuzing and arming device which is more free from surreptitious tampering.

Another object is to provide an explosive missile which is free from accidental fuzing and arming without leaving the aircraft.

Still another object is to provide an indication for the pilot upon release malfunction of the missile.

Other objects and many of the attendant advantages of this invention will be readily appreciated as the same become better understood by reference to the following detailed description when considered in connection with the accompanying drawings in which like reference numerals designate like parts throughout the figures thereof and wherein:

FIG. 1 is a side view of the laser communication system situated in an aircraft partially cut away;

FIG. 2 is another embodiment of the laser communication system of FIG. 1;

FIG. 3 is a side view of the embodiment of FIG. 2 after the missile has been released from the aircraft;

FIG. 4 is a schematic diagram of one of the embodiments showing the internal connections between the laser photoconductive light detectors;

FIG. 5 is a schematic diagram of another embodiment of the invention in which the laser is replaced by more conventional components.

FIG. 1 illustrates an aircraft 11 containing a modulator 12 which is connected to a laser 13 for modulating the light energy output of the laser in accordance with a selected input to the modulator 12. A missile 14 is suspended beneath the aircraft 11 by conventional attach and release means 16. The missile 14 is positioned under the aircraft 11 so that the modulated output of laser 13 is focused to actuate a battery in well 18 within the missile 14. A photoconductive light detector is positioned in a well 19 forward of the well 18 in the missile to be activated by the modulated laser output light energy after the missile is released from the aircraft, as will be described more fully in relation to FIG. 3. The interconnection between the battery in well 18 and the photoconductive light detector in well 19 will be more fully explained in conjunction with FIG. 4, however, the purpose of the photoconductive light detector is generally to receive the modulated light pulses of the laser output once the missile has been released from the aircraft 11.

FIG. 2 illustrates another embodiment of the invention in which the missile 14 is attached to the aircraft 11 in a conventional manner as shown in FIG. 1. The laser 13 is again focused to actuate a battery in well 18. A second laser 13′, similar to laser 13, can be modulated by a modulating source (not shown) and is positioned so that the light energy from the laser 13′ is directed toward the skin of the missile 14. In the position shown in FIG. 2 the light energy will be reflected back to the aircraft 11 to be detected by the detector 21. In this manner the sequence of operation would be to initiate the laser 13, release the missile 14 from the aircraft 11 and then by means of laser 13′ select the proper fuze and coincidentally check to determine that the missile 14 has actually been released from the aircraft 11.

FIG. 3 illustrates the missile 14 in the position it would be in after release from the aircraft 11 with the missile having retarded a small distance in respect to the aircraft so that the laser 13′ electromagnetic energy output is directed into the photoconductive light detector well 19′. In a similiar manner the missile 14 of FIG. 1 after it is released from the aircraft 11 would retard with respect to the aircraft 11 so that the detector well 19, FIG. 1, would then be in position to receive the light energy from the laser 13. The essential difference between the two embodiments is that one laser is utilized in one embodiment while in the other two lasers are utilized with the added advantage that a photoconductive light detector 21, FIG. 2, is provided to detect and inform the pilot of the aircraft that the missile has actually been released from the aircraft.

FIG. 4 illustrates schematically the components within the missile 14. The outside layer of the missile 14 is made of a radio-frequency conductive skin 22 which completely encloses the missile 14. Another alternative for this radio frequency skin 22 is that it be of the type to merely enclose the circuitry within the missile as will be described in relation to FIG. 5. The skin 22 being radio-frequency (RF) conductive provides a means for preventing RF energy from entering the interior of the missile 14 so that as a consequence, within the missile itself there are no RF voltages available. The apertures within the skin 22 formed by waveguides 23 are designed in such a manner that the diameter of the waveguide is less than one-half the wave length of the waves which are to be rejected and the total length of the waveguide is several times the length of the waves which are to be rejected so that, in a well known manner, the waveguide effectively rejects all RF waves and voltages. This is due to the fact that the RF is attenuated to such an extent that it is effectively eliminated. In order to make the aperture conform to the general shape of the missile an optical window 24 is placed at the aperture of the wave guide coplanar with the RF conductive skin 22. This optical window will pass all light wavelengths. Positioned within the waveguide to receive the waves passed therethrough is a narrow-bandpass optical filter 26 which is of the type that passes only wavelengths within the spectrum output of the laser 13. The wavelength after passing through the optical filter 26 passes through a convergent lens 27 so that the laser wavelengths passing therethrough are focused upon a point which has an explosive primer 28 located at the point of convergence. The energy of the light waves produced by the laser 13 are such that the converging of them on the explosive primer 28 concentrates a sufficient amount of energy to cause the explosive primer to explode. The explosive primer 28 is located in the topmost portion of a battery shown generally at 29 which, in this embodiment, contains an electrolyte 31 in the top portion thereof within a container separated from the anode and cathode plates 32 of the battery. Upon explosion of the explosive primer 28 the electrolyte is forced from the uppermost container of the battery 29 and flows between the plates 32 thereby energizing the battery 29 to provide electrical power to the other circuitry within the missile 14. Another type battery 29 which is suitable in this application is of the thermal type battery, as disclosed in Tenth Annual Battery Research Conference "Thermal Cells" by E. McKee, pages 26–28, wherein the electrolyte is in the solid state until a sufficient amount of energy is absorbed to change the state of the electrolyte from the solid to the liquid state at which time the battery becomes activated.

The photoconductive light detector well 19' of FIG. 4 is constructed in essentially the same manner as the battery well 18. An optical window 24' is placed at the surface of the missile and a narrow-bandpass optical filter 26' is placed within the waveguide 23'. The laser light energy which passes the narrow bandpass optical filter 26' impinges upon a PNPN light sensitive switch 33 which becomes conductive upon receipt of light energy. Two separate pairs of conductors connect to the light switching device 34, one pair being connected to PNPN light sensitive switch 33, and the other pair being connected to conduct power from the battery 29 to the switching device 34. The switching device is of the ordinary type in which each impulse received from the photoconductive light detector 19' causes the activation of a relay to selectively connect the power of the battery 29 to one of a plurality of outputs from the switching device 34. One example would be that the PNPN switch 33 closes a circuit to activate a stepping relay in response to each pulse received from the aircraft 11. A photoconductive cell or a photovoltaic cell may conveniently be utilized in lieu of the photoconductive light detector. More complicated types of switching devices can be used without altering the nature of the invention.

The switching device 34, in accordance with the code received, connects the power from the battery 29 to one of the plurality of conductors connecting the switching device 34 to a fuzing and arming device 36. This fuzing and arming device is of a conventional type in which the arming portion of the device could be a mechanical safety device which has an arming wire or lanyard removed upon release of the missile from the aircraft 11 to allow the proper fuzing device to be connected to the switching device. The various fuzing devices could be of several different types, for example, the proximity fuze, the infrared type fuze, the time delayed fuze, or any other type of fuze which is known and generally used.

The sequence of operation for the release of the missile 14 from the aircraft 11 would be a first command from the pilot to activate the battery 29 by means of a single burst of energy from laser 13 followed by a subsequent command to release the missile from the aircraft. Upon the release from the aircraft an arming safety device of the missile allows the subsequent selection of a proper fuse by the pilot of the aircraft, which is communicated to the missile by means of coded pulses produced by modulating the laser output of the aircraft.

FIG. 5 illustrates another embodiment of the invention and shows the aircraft 11, the missile 14 and attaching and releasing means 16. The devices of FIG. 5 does not utilize a laser but utilizes a D.C. pulse from the aircraft 11 to energize a solenoid 37 which drives a pin through the RF shield 22' and into an explosive primer 28' to cause activation of the battery 29 in a manner similar to that described hereinbefore. This activation of the battery is coincidental and simultaneous with the release of the missile from the aircraft, and since the solenoid 37 is sensitive only to a D.C. pulse source, it is free from actuation by RF voltages. The RF shield 22' completely encloses all of the electrical circuitry associated with the detonating warhead including the power source battery 29, thereby maintaining that circuitry free from all RF voltages generated on the airfield or within the aircraft 11. The activation of the battery 29 causes a time delay device 38 to become activated and after a predetermined time close a switch to connect the electrical power from the battery 29 to the PNPN light sensitive switch 33' and simultaneously remove an optical shutter 39 from the light path to the PNPN light sensitive switch 33' through a suitable light tube 41; which can either be a hollow tube, a piece of Lucite, an optical prism or any other light conducting means. Attached to the nose of the missile 14 is a preset fuzing and arming device 36' in which the fuze is set before the missile is placed on the aircraft and could be any of the aforementioned types such as a proximity fuze so that after release of the missile from the aircraft and upon the missile's approach to the target the proximity fuze and arming device activates a light and power source 42 which light would be conducted down the light tube 41 to close the PNPN light sensitive switch. The closing of the last mentioned switch causes the electrical power from the battery to pass through the resistor primer 43 to cause ignition of the explosive contained within the primer box 44 and thereby ignite the warhead, which is carried in the missile 14, by fracturing the RF conductive skin 22.

The embodiment of FIG. 5 utilizes the principle of shielding the detonating device from all RF energy and of detonating the device by means of light energy while the illustrative embodiments of FIGS. 1 through 4 show the utilization of a laser communication system to provide a communication system which is free from RF voltage hazards and is practically immune to enemy jamming devices in that it is a line of sight type of optical communication which utilizes the advantages of the high energy output available from a laser to effect a simple but very effective detonating device for a missile. One of the advantages of utilizing a laser communication type system is the fact that the laser output is of a narrow frequency band and of a very high energy output so that ordinary light communication systems are unable to effect the detonation of the device since they fail to have a sufficient energy to produce the desired result. The light from the sun, within the spectral bandwidth of the laser is not sufficient to activate the laser receiver.

It should be understood, of course, that the foregoing disclosure relates to only several illustrative embodiments of the invention and that numerous modifications or alterations may be made therein without departing from the spirit and scope of the invention as set forth in the appended claims.

What is claimed is:

1. A laser light wave communications receiver comprising:
    a closed conductive enclosure for collecting and absorbing radio frequency voltages,
    a waveguide means inserted into and forming an aperture in said conductive enclosure for passing only electromagnetic wave lengths above the radio frequency spectrum,
    an optical filter means inserted into said wave guide means and closing the aperture for passing predetermined wavelengths of light,
    and a detector means inserted into said wave guide and within the enclosure for detecting the light waves passed by said filter means.

2. A light communication system comprising:
    (a) a laser for transmitting intelligence by energy of light waves of a predetermined wave length,
    (b) a modulator connected to said laser for varying the light wave output of said laser in accordance with the intelligence to be transmitted,
    (c) a receiver optically connected to said laser for receiving a transmitted intelligence from said laser having
        (1) an optical filter for passing only the light waves of the predetermined wavelength,
        (2) detector means for receiving light waves passed by said filter,
        (3) a waveguide means for rejecting radio frequency waves below predetermined wave length and for holding said filter and said detector means,
        (4) and a shield means connected to said waveguide means and forming an enclosure for said optical filter and said detector means for absorbing radio frequency voltages.

3. A laser and light wave communication system for use with an explosive missile comprising:
    a conductive radio frequency shield forming a closed container,
    a waveguide means inserted into, connected to and forming an aperture in said shield for excluding radio frequency wavelengths,
    an optical filter means closing the aperture in said waveguide means for passing predetermined wavelengths of light,
    a detector means within said waveguide means for absorbing the light waves passed by said filter means,
    utilization means including a power supply and a switch device connected to said detector means for receiving the energy pulses from the detector means and for supplying an electrical power output in accordance with a predetermined sequence of input or electrical energy pulses,
    and a fuzing and arming device connected to the electrical power output of said utilization means for initiating the detonation of the explosive upon receipt of power from said utilization means.

4. A laser light wave communications receiver comprising:
    a conductive shield absorbing all radio frequency waves coming into contact therewith and forming a radio frequency free space enclosure,
    a first and a second waveguide means forming a first and a second aperture in said conductive shield for passing predetermined light wavelengths and rejecting radio frequency wavelengths,
    a first and a second optical filter means closing the first and the second aperture respectively and for passing the predetermined light waves,
    a convex optical lens positioned in said first waveguide means for converging to a point the light waves passed by said first filter means,
    a source of electrical energy,
    a primer means located at the point of convergence of the predetermined light waves being responsive to the energy of the lightwaves above a predetermined minimum for activating said source of electrical energy,
    a light responsive switching means positioned in said second wave guide means for changing its state of conduction in response to light waves received from said second filter means,
    a switch means connected to said source of electrical energy and to said light responsive switching means for selectively connecting said source of electrical energy to a different output in response to a number of input pulses received,
    and a utilization means connected to the output of said switch means for selectively utilizing the electrical energy dependent upon the particular output terminal energized.

5. Apparatus as recited in claim 4 wherein said utilization means comprises a fuzing and arming device having a plurality of fuzes each connected to a different output terminal of said switch means.

6. Apparatus as recited in claim 5 wherein said utilization means further includes a mechanical time delay arming device.

7. A laser communication system comprising:
    (a) at least one modulator,
    (b) at least one laser connected to said modulator having the light energy output laser modulated in accordance with an input to the modulator,
    (c) at least one receiving station for utilizing light energy of a laser having,
        (1) a conductive radio frequency shield forming a radio frequency free container,
        (2) at least one waveguide means inserted into said radio frequency shield and in communication with the interior of the container for excluding by attenuation all radio frequency signal therefrom,
        (3) an optical filter means within each of said waveguide means for passing predetermined wavelengths and excluding all other optical wavelengths,
        (4) a detector means within each of said waveguide means for receiving the predetermined wavelength passed by said optical filter means
    and at least one utilization means connected to each of said detector means.

8. A laser communication system comprising:
    a laser means for producing light energy output,
    a modulator means connected to said laser for selectively controlling the light energy output of said laser,
    a switching means having a first input terminal, a second input terminal and a plurality of output terminals,
    a first laser optical receiving means positioned in the optical path of said laser during a first period of time and connected to the first terminal of said switching means and being responsive to the first laser signal output to energize said switching means,
    a second laser optical receiving means positioned in the optical path of said laser during a second period of time and connected to said second input terminal of said switching means and being responsive to the second signal output to selectively energize one of the plurality of output terminals of said switching means, and a utilization means connected to the output terminals of said switching means and operative in a predetermined manner in accordance with the output terminal of said switching means energized.

9. Apparatus as recited in claim 8 further comprising:
a conductive shield means forming a radio frequency free environment and containing therein said switching means, said first and second laser optical receiving means and said utilization means,
a first and a second waveguide means inserted into and forming an aperture in said conductive shield means for passing laser light wavelengths and rejecting radio frequency wavelengths and containing therein said first and said second laser optical receiving means respectively.

10. Apparatus as recited in claim 9 further comprising:
a first and a second optical filter means positioned within said first and second waveguide means and before said first and second laser optical receiving means for passing light wavelengths of predetermined frequency.

11. Apparatus as recited in claim 10 further comprising:
an optical lens positioned within said first waveguide means for converging to a point of the light wavelengths passed by said first optical filter means at said first laser optical receiving means.

12. Apparatus as recited in claim 11 wherein said first laser optical receiving means is an explosive primer of a battery.

13. Apparatus as recited in claim 11 wherein said first laser optical receiving means is a thermal battery.

No references cited.

BENJAMIN A. BORCHELT, *Primary Examiner.*
SAMUEL FEINBERG, *Examiner.*
L. L. HALLACHER, W. C. ROCH, *Assistant Examiners.*